United States Patent [19]

Nakaya

[11] Patent Number: 5,564,253

[45] Date of Patent: Oct. 15, 1996

[54] METHOD OF CONTROLLING FEED IN CENTERLESS VENEER LATHE AND APPARATUS FOR THE SAME

[75] Inventor: Takashi Nakaya, Chita-gun, Japan

[73] Assignee: Meinan Machinery Works, Inc., Ohbu, Japan

[21] Appl. No.: 552,099

[22] Filed: Nov. 2, 1995

[30] Foreign Application Priority Data

Nov. 7, 1994 [JP] Japan .................................... 6-298909

[51] Int. Cl.$^6$ ................................................ B27B 1/00
[52] U.S. Cl. ................... 144/356; 144/365; 364/474.09
[58] Field of Search ................................ 144/356, 357, 144/365, 213; 82/118, 117; 364/474.09

[56] References Cited

U.S. PATENT DOCUMENTS

| | | | |
|---|---|---|---|
| 4,266,276 | 5/1981 | Hayashi et al. | 364/474.09 |
| 4,737,904 | 4/1988 | Ominato | 364/474.09 |
| 5,141,038 | 8/1992 | Nakaya | 144/357 |
| 5,333,658 | 8/1994 | Albion et al. | 304/474.09 |
| 5,490,548 | 2/1996 | Paranen | 144/356 |

Primary Examiner—W. Donald Bray
Assistant Examiner—Gene L. Kim
Attorney, Agent, or Firm—Lahive & Cockfield

[57] ABSTRACT

The method of the present invention realizes accurate control of the feed rate in a veneer lathe under a centerless condition and improves the productivity of the veneer lathe. After spindles (8a) are moved away and disengaged from the axial ends of a log (11), that is, under the centerless condition, the method of the invention controls the feed rate of a knife carriage (9) based on the current rotating speed of the log (11), which is measured by a speed measuring device (7) engaged with the periphery of the log (11). When a difference between the current rotating speed of the log (11) measured by the speed measuring device (7) and a theoretical rotating speed of the log (11) driven by a peripheral drive system (2) exceeds a preset level, the method of the present invention stops the feeding operation of knife carriage (9) and thereby the veneer peeling operation of the veneer lathe. This structure effectively prevents the lowered productivity of veneers and keeps the veneers free from obvious or conspicuous traces of engagement with the peripheral drive system or cracks due to the insufficient synchronism of the veneer lathe with a subsequent veneer processing apparatus.

7 Claims, 5 Drawing Sheets

METHOD OF CONTROLLING FEED IN CENTERLESS VENEER LATHE AND APPARATUS FOR THE SAME

BACKGROUND OF THE INVENTION

1. Field of the Invention

The present invention relates to a method of controlling feed in a centerless veneer lathe and also to an apparatus for the same.

2. Description of the Related Art

In a known technique of peeling veneers from a log under a centerless or spindleless condition, spindles are moved away from the log at a convenient time in the process of veneer peeling operation or alternatively spindles are not used at all from the beginning of the veneer peeling operation. In such a veneer lathe under the centerless condition (hereinafter may be referred to as centerless veneer lathe), the torque required for the peeling operation is only given from a peripheral drive system. The feed control process applied to such centerless veneer lathes controls the feed rate of a feed mechanism in accordance with the theoretical rotating speed of the log driven by the peripheral drive system. When a slippage of the peripheral drive system or a variation in incising depth of the peripheral drive system into the log causes a significant difference between the actual rotating speed and the theoretical rotating speed, however, the conventional feed control process can not accurately control the feed rate, thereby resulting in errors in thickness of veneers peeled from the log.

In the U.S. Pat. No. 5,141,038 (JAPANESE PATENT LAYING-OPEN GAZETTE No. 4-65201) under the title of 'Apparatus for feed controlling in a centerless veneer lathe', the inventor has proposed an improved structure of centerless veneer lathe, which includes a speed measuring device engaged with the peripheral surface of a log for measuring the rotating speed of the log. This improved structure controls the feed rate of the feed mechanism based on the measurement by the speed measuring device under the centerless conditions that spindles are disengaged from the log.

Even when the actual rotating speed measured by the speed measuring device is deviated significantly from the theoretical rotating speed of the log specified by the peripheral drive system, the proposed apparatus adjusts the feed rate of the feed mechanism based on the measurement by the speed measuring device, that is, based on the actual rotating speed of the log. This structure effectively prevents errors in thickness of veneers peeled from the log.

Since substantially no errors in veneer sheet thickness are induced by the difference between the actual rotating speed and the theoretical rotating speed of the log, the proposed apparatus continues the veneer peeling operation until the log 11 has been peeled down to a minimum diameter. Another problem, however, arises in this apparatus.

While inducing no errors in veneer sheet thickness, a significant difference between the actual rotating speed and the theoretical rotating speed of the log lowers the productivity of veneers and makes the traces of engagement with the peripheral drive system obvious or conspicuous. In a flow system where a veneer lathe is coupled with a veneer cutter or another veneer processing apparatus for synchronous operations at a theoretical processing rate, the significant difference may cause an insufficient synchronism of the veneer lathe with the subsequent apparatus and thereby induce cracks and damages of the veneers.

SUMMARY OF THE INVENTION

The object of the invention is thus to realize accurate control of the feed rate in a veneer lathe under a centerless condition and improve the productivity of the veneer lathe.

The above and the other related objects are realized by a method of controlling feed in a veneer lathe under a centerless condition. The veneer lathe used for peeling veneers from a log includes a movable knife carriage having a veneer knife carried thereon, feed means for feeding the knife carriage toward the log at a controlled variable feed rate, peripheral drive means for rotating the log from the periphery thereof in a predetermined direction at a first peripheral speed, and a pair of rotatable spindles engageable with the log at the axial opposite ends thereof for rotating the log while holding the log therebetween, the pair of spindles being disengageable from the log ends in the middle of a veneer peeling operation to hold the veneer lathe in the centerless condition. The method includes the steps of:

(a) monitoring a current diameter of the log while the log diameter is being decreased as the veneer peeling operation proceeds;

(b) measuring a current peripheral speed of the rotating log;

(c) calculating a current rotating speed of the log based on the current diameter of the log monitored in the step (a) and the current peripheral speed of the log measured in the step (b);

(d) controlling the feed rate of the knife carriage at least under the centerless condition, based on the current rotating speed of the log calculated in the step (c);

(e) calculating a theoretical rotating speed of the log based on the first peripheral speed of the log driven by the peripheral drive means and the current diameter of the log monitored in the step (a);

(f) comparing the current rotating speed of the log calculated in the step (c) with the theoretical rotating speed of the log calculated in the step (e) to determine a difference between the current rotating speed and the theoretical rotating speed of the log; and (g) forcibly stopping the feed of the knife carriage by the feed means when the difference between the current rotating speed and the theoretical rotating speed of the log is not less than a preset level.

The method of the present invention accurately controls the feed rate of the knife carriage under the centerless condition based on the current rotating speed of the log, which is calculated from the current peripheral speed of the rotating log and the current diameter of the log. This structure allows the feed rate in the veneer peeling operation to be adjusted in close relation to the actual rotating speed of the log, thereby eliminating errors in veneer sheet thickness due to the inaccurate feed rate.

When the difference between the current rotating speed of the log calculated in the step (c) and the theoretical rotating speed of the log calculated in the step (e) exceeds a preset level, the method of the present Invention stops the feeding operation of the feed means and thereby the veneer peeling operation of the veneer lathe under the centerless condition. This structure effectively prevents the lowered productivity of veneers and keeps the veneers free from obvious or conspicuous traces of engagement with the peripheral drive system or cracks due to the insufficient synchronism of the veneer lathe with a subsequent veneer processing apparatus. Namely the method of the invention improves the productivity of the veneer lathe.

The invention is also directed to another method of controlling feed in a veneer lathe under a centerless condition, the veneer lathe used for peeling veneers from a log including a movable knife carriage having a veneer knife carried thereon, feed means for feeding the knife carriage toward the log at a controlled variable feed rate, peripheral drive means for rotating the log from the periphery thereof in a predetermined direction at a first peripheral speed, and a pair of rotatable spindles engageable with the log at the axial opposite ends thereof For rotating the log while holding the log therebetween, the pair of spindles being disengageable from the log ends in the middle of a veneer peeling operation to hold the veneer lathe in the centerless condition. The method includes the steps of:

(a) monitoring a current diameter of the log while the log diameter is being decreased as the veneer peeling operation proceeds;

(b) measuring current peripheral speeds of the rotating log at a plurality of different positions in a direction of fibers of the log;

(c) calculating a plurality of current rotating speeds of the log based on the current diameter of the log monitored in the step (a) and the current peripheral speeds of the log measured in the step (b);

(d) controlling the feed rate or the knife carriage at least under the centerless condition, based on one of the plurality of current rotating speeds of the log calculated in the step (c);

(c) calculating a theoretical rotating speed of the log based on the first peripheral speed of the log driven by the peripheral drive means and the current diameter of the log monitored in the step (a);

(f) comparing the plurality of current rotating speeds or the log calculated in the step (c) with the theoretical rotating speed of the log calculated in the step (e) to determine differences between the respective current rotating speeds and the theoretical rotating speed of the log; and (g) forcibly stopping the feed of the knife carriage by the feed means when at least one of the differences between the respective current rotating speeds and the theoretical rotating speed of the log is not less than a preset level.

The objects are also realized by an apparatus for controlling feed in a veneer lathe under a centerless condition. The veneer lathe used for peeling veneers from a log includes a movable knife carriage having a veneer knife carried thereon, feed means for feeding the knife carriage toward the log at a controlled variable feed rate, peripheral drive means for rotating the log from the periphery thereof in a predetermined direction at a first peripheral speed, and a pair of rotatable spindles engageable with the log at the axial opposite ends thereof for rotating the log while holding the log therebetween, the pair of spindles being disengageable from the log ends in the middle of a veneer peeling operation to hold the veneer lathe in the centerless condition. The apparatus of the invention includes monitor means for monitoring a current diameter of the log while the log diameter is being decreased as the veneer peeling operation proceeds, peripheral speed measuring means engageable with the log on the peripheral surface thereof and rotating therewith for measuring a current peripheral speed of the rotating log, first calculation means for calculating a current rotating speed of the log based on the current diameter of the log monitored by the monitor means and the current peripheral speed of the log measured by the peripheral speed measuring means, control means for controlling the feed rate of the knife carriage at least under the centerless condition, based on the current rotating speed of the log calculated by the first calculation means, second calculation means for calculating a theoretical rotating speed of the log from the first peripheral speed of the log driven by the peripheral drive means and the current diameter of the log monitored by the monitor means, comparison means for comparing the current rotating speed of the log calculated by the first calculation means with the theoretical rotating speed of the log calculated by the second calculation means to determine a difference between the current rotating speed and the theoretical rotating speed of the log, and stop means for forcibly stopping the feed of the knife carriage by the feed means when the difference between the current rotating speed and the theoretical rotating speed of the log is not less than a preset level.

In accordance with one preferable structure, the peripheral drive means includes a plurality of drive wheels, each drive wheel having a number of spikes arranged on the periphery thereof to be engageable with the peripheral surface of the log.

The invention is also directed to another apparatus for controlling feed in a veneer lathe under a centerless condition, the veneer lathe used for peeling veneers from a log including a movable knife carriage having a veneer knife carried thereon, feed means for feeding the knife carriage toward the log at a controlled variable feed rate, peripheral drive means for rotating the log from the periphery thereof in a predetermined direction at a first peripheral speed, and a pair of rotatable spindles engageable with the log at the axial opposite ends thereof for rotating the log while holding the log therebetween, the pair of spindles being disengageable from the log ends in the middle of a veneer peeling operation to hold the veneer lathe in the centerless condition. The apparatus includes monitor means for monitoring a current diameter of the log while the log diameter is being decreased as the veneer peeling operation proceeds, a plurality of peripheral speed measuring means arranged at a plurality of different positions in a direction of fibers of the log on the peripheral surface thereof, each peripheral speed measuring means comprising a roll member engageable with the peripheral surface of the log and independently driven and rotated thereby for measuring a current peripheral speed of the rotating log, first calculation means for calculating a plurality of current rotating speeds of the log based on the current diameter of the log monitored by the monitor means and a plurality of current peripheral speeds of the log measured by the plurality of peripheral speed measuring means, control means for controlling the feed rate of the knife carriage at least under the centerless condition, based on one of the plurality of current rotating speeds of the log calculated by the first calculation means, second calculation means for calculating a theoretical rotating speed of the log from the first peripheral speed of the log driven by the peripheral drive means and the current diameter of the log monitored by the monitor means, comparison means for comparing the plurality of current rotating speeds of the log calculated by the first calculation means with the theoretical rotating speed of the log calculated by the second calculation means to determine differences between the respective current rotating speeds and the theoretical rotating speed of the log, and stop means for forcibly stopping the feed of the knife carriage by the feed means when at least one of the differences between the respective current rotating speeds and the theoretical rotating speed of the log is not less than a preset level.

In one preferable structure, the roll members of the peripheral speed measuring means independently driven and rotated by the log also work as backup rolls.

According to one preferable application, the peripheral drive means includes a plurality of drive wheels, each drive wheel having a number of spikes arranged on the periphery thereof to be engageable with the peripheral surface of the log. The plurality of drive wheels are arranged at positions substantially corresponding to those of the roll members of the peripheral speed measuring means independently driven and rotated by the log.

These and other objects, features, aspects, and advantages of the present invention will become more apparent from the following detailed description of the preferred embodiments with the accompanying drawings.

DESCRIPTION OF THE PREFERRED EMBODIMENT

Figure 1:
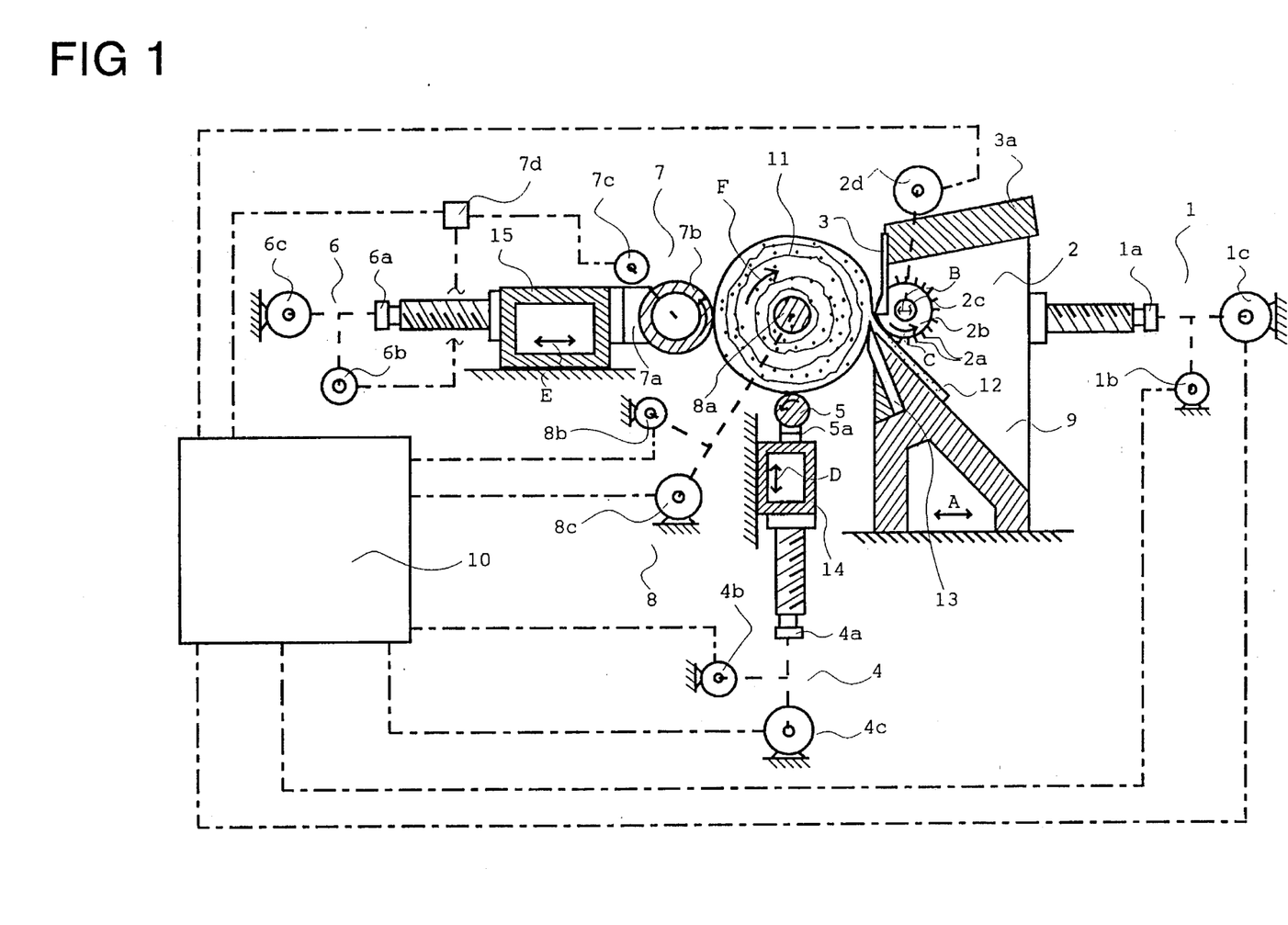
FIG. 1 is side view schematically illustrating a typical structure of a centerless veneer lathe, to which a feed controlling method is applied as a first embodiment according to the present invention.

FIG. 1 is side view schematically illustrating a typical structure of a centerless veneer lathe, to which a feed controlling method is applied as a first embodiment according to the present invention.

The centerless veneer lathe of the first embodiment includes a feed mechanism 1 for reciprocating a knife carriage 9 along a predetermined path, a peripheral drive system 2 for rotating a log 11 from its periphery in a predetermined direction, a device 7 for measuring the rotating speed of the log 11, a center drive system 8 engageable with the center of the log 11 for holding and rotating the log 11, and a control unit 10 for controlling the feed rate of the knife carriage 9.

The feed mechanism 1 includes a pair of rotatable feed screws 1a, such as ball threads, a position detector 1b, such as a rotary encoder, and a variable-speed motor 1c, such as a servomotor. The pair of rotatable feed screws 1a are engaged with the knife carriage 9 with a veneer knife 13 carried thereon. The variable-speed motor 1c rotates the pair of feed screws 1a in a clockwise or counterclockwise direction to move the knife carriage 9 along a predetermined path toward and away from the log 11, as indicated by the double-headed arrow A in FIG. 1. The position detector 1b is connected to either one of the feed screws 1a for monitoring the rotation thereof so as to detect the current position of the knife carriage 9 and thereby the current diameter of the log 11. The control unit 10 receives information representing the current position of the knife carriage 9 (or the current diameter of the log 11) as an output from the position detector 1b. The variable-speed motor 1c has an output connected to the control unit 10, which controls the variable-speed motor 1c in response to the output in order to move the knife carriage 9 at any desired feed rate.

The peripheral drive system 2 includes a plurality of drive wheels 2b disposed at axially spaced intervals on a common drive shaft 2c, which is supported to be elastically displaceable in a restricted range as indicated by the double-headed arrow B. Each drive wheel 2b has a number of spikes 2a which are arranged on the periphery thereof to be engageable with the peripheral surface of the log 11 adjacent to the cutting edge of the veneer knife 13. The peripheral drive system 2 further includes a constant-speed motor 2d, such as a three-phase induction motor, for driving the drive shaft 2c at a predetermined substantially constant speed in a counterclockwise direction as indicated by the arrow C in FIG. 1. Rotation of the drive shaft 2c at the substantially constant speed drives and rotates the log 11 from its periphery at a substantially constant peripheral speed in the clockwise direction as indicated by the arrow F in FIG. 1. The predetermined constant speed generally represents a rated driving speed, at which a log of standard hardness is driven. The constant-speed motor 2d has an output connected to the control unit 10, which controls operation of the constant-speed motor 2d in response to the output.

There are a plurality of sectional pressure bars 3 fixed to a support block 3a. Each sectional pressure bar 3 is positioned between any two adjacent drive wheels 2b on the common drive shaft 2c for applying pressure to the log 11 adjacent to the position where the cutting edge of the veneer knife 13 is engaged with the log 11. The sectional pressure bars 3 effectively prevent a veneer 12 from being undesirably split in the process of peeling from the log 11.

A lifting mechanism 4 for moving a plurality of backup rolls 5 in a vertical direction includes a plurality of rotatable lead screws 4a, such as ball threads, a position detector 4b, such as a rotary encoder, and a variable-speed motor 4c, such as a servomotor. The plurality of rotatable lead screws 4a are engaged with a support frame 14 slidably mounted on the casing of the veneer lathe. The variable-speed motor 4c rotates the plurality of lead screws 4a in a clockwise or counterclockwise direction to move the support frame 14 in the vertical direction, as indicated by the double-headed arrow D in FIG. 1. The position detector 4b is connected to any one of the lead screws 4a for monitoring the rotation thereof and transmits its output to the control unit 10. The variable-speed motor 4c has an output connected to the control unit 10, which controls the variable-speed motor 4c in response to the output in order to move the support frame 14 at any desired rate.

The plurality of backup rolls 5 are freely rotatably mounted on the support frame 14 via a bearing box 5a. The backup rolls 5 are movable to come into contact with the periphery of the log 11 at any desired time during the peeling operation in order to support and back up the log 11 from its bottom and prevent the log 11 from bowing because of its own weight. The control unit 10 controls operation of the variable-speed motor 4c for rotating the lead screws 4a, so that the backup rolls 5 are moved at predetermined rates to maintain their engagement with the periphery of the log 11.

A shifting mechanism 6 for moving a roll 7b used to measure the peripheral or surface speed of the log 11 includes a rotatable lead screw 6a, such as a ball thread, a position detector 6b, such as a rotary encoder, and a variable-speed motor 6c, such as a servomotor. The lead screw 6a is engaged with a support frame 15 slidably mounted on the casing of the veneer lathe. The variable-speed motor 6c rotates the lead screw 6a in a clockwise or counterclockwise direction to shift the support frame 15 in the horizontal direction, as indicated by the double-headed arrow E in FIG. 1. The position detector 6b is connected to the lead screw 6a for monitoring the rotation thereof and transmits its output to the control unit 10. The variable-speed motor 6c has an output connected to the control unit 10, which controls the variable-speed motor 6c in response to the output in order to move the support frame 15 at any desired rate.

The device 7 for measuring the rotating speed of the log 11 includes the speed measuring roll 7b freely rotatably supported by the slidable support frame 15 via a bearing box 7a. The roll 7b used to measure the peripheral speed of the log 11 is movable to come into contact with the peripheral surface of the rotating log 11 at any desired time during the peeling operation. The speed measuring roll 7b also works as a backup roll to support the log 11 from the lateral side opposite to the drive wheels 2b, so as to prevent the log 11 from being bent in the horizontal direction by the pressure exerted by the drive wheels 2b. The device 7 further includes a rotation counter 7c, such as a rotary encoder, connected to the roll 7b to measure the current peripheral speed of the log 11, and a calculator 7d for calculating the current rotating speed of the log 11 based on the current peripheral speed of the log 11 measured by the rotation counter 7c and the current diameter of the log 11 indirectly detected by the position detector 1b of the feed mechanism 1. The control unit 10 receives information representing the current rotating speed of the log 11 as an output from the calculator 7d.

In order to ensure accurate measurement of the peripheral speed of the log 11, the speed measuring roll 7b should be engaged with the periphery of the log 11 with as little slippage as possible. For this purpose the roll 7b may be coated with material such as rubber or abrasive paper or cloth or has grooves or knurls formed thereon in order to increase the coefficient of friction when being in contact with the peripheral surface of the log 11. Alternatively, the roll 7b may have a number of small projections which do not vary the incising depth into the log 11 with a variation in hardness of the log 11.

The center drive system 8 includes a pair of power-driven spindles 8a arranged via a reciprocating mechanism (not shown), such as a hydraulic cylinder, to be axially movable toward and away from the center of the log 11. The pair of spindles 8a are driven by a variable-speed motor 8c, such as a d.c. motor, to rotate the log 11 in the clockwise direction as indicated by the arrow F in FIG. 1. The control unit 10 receives an output from the variable-speed motor 8c and controls operation of the variable-speed motor 8c. The center drive system 8 further includes a rotation counter 8b, such as a rotary encoder, connected to either one of the spindles 8a to monitor the rotating speed thereof. The control unit 10 also receives information representing the speed of the spindle 8a as an output from the rotation counter 8b. The variable-speed motor 8c of the center drive system 8 controlled by the control unit 10 drives and rotates the center of the log 11 at any arbitrary speed or variable speed corresponding to the driving speed of the log 11 effected by the constant-speed motor 2d of the peripheral drive system 2.

The control unit 10 is, for example, constructed as a microcomputer including a CPU (central processing unit), a ROM (read only memory), and a RAM (random access memory); these elements are not specifically shown In the drawing. The control unit 10 receives information from the position detectors 1b, 4b, and 6b, the calculator 7d, and the rotation counter 8b and controls operation of the respective motors 1c, 4c, 6c, and 8c. The respective motors 1c, 4c, 6c, and 8c may be controlled independently during preparation for a veneer peeling operation or after the veneer peeling operation by means of manual or semiautomatic operations. The control unit 10 controls these motors 1c, 4c, 6c, and 8c in a conjunctive manner during the veneer peeling operation.

The following explains actual operation of the veneer lathe thus constructed.

Prior to the veneer peeling operation, a log 11 having an irregular peripheral surface is held between the pair of spindles 8a and driven by the variable-speed motor 8c of the center drive system 8 to idly rotate with the pair of spindles 8a, while the knife carriage 9, the backup rolls 5, and the speed measuring roll 7b are retracted in their original positions. The variable-speed motor 1c of the feed mechanism 1 starts to rotate the feed screws 1a in the clockwise direction to move the knife carriage 9 toward the rotating log 11 at a desired rapid rate until the veneer knife 13 mounted on the knife carriage 9 is brought into contact and cutting engagement with the periphery of the rotating log 11. While the knife carriage 9 is moved toward the log 11 by the feed mechanism 1, the driving speed of the log 11 by the center drive system 8 and the rapid feed of the knife carriage 9 by the feed mechanism 1 may be set arbitrarily according to the requirements. Simultaneously with the cutting engagement of the veneer knife 13 with the periphery of the rotating log 11, the plurality of drive wheels 2b of the peripheral drive system 2 are engaged with the periphery of the log 11.

After the veneer knife 13 is engaged with the log 11 for cutting, the variable-speed motor 8c starts to drive the pair of spindles 8a at the variable speed which corresponds to or follows the driving speed of the log 11 effected by the constant-speed motor 2d of the peripheral drive system 2. According to a concrete procedure, the control unit 10 determines the variable speed of rotation of the pair of spindles 8a in response to the substantially constant peripheral speed of the log 11 effected by the plurality of drive wheels 2b of the peripheral drive system 2 and the current diameter of the log 11 indirectly detected by the position detector 1b of the feed mechanism 1. The diameter of the log 11 gradually decreases as the veneer peeling operation proceeds. Upon engagement of the veneer knife 13 with the periphery of the log 11, the knife carriage 9 is moved toward the axial center of the log 11 by the feed mechanism 1 at the feed rate controlled in accordance with the rotating speed of the spindle 8a monitored by the rotation counter 8b of the center drive system 8. This operation allows the veneer knife 13 to cut into the rotating log 11 by a predetermined amount for each turn of the spindles 8a.

At any convenient time during the veneer peeling operation and before the spindles 8a are retracted away from the log axial ends to hold the veneer lathe in a centerless condition, for example, at a time immediately after the log 11 has been rounded to become substantially cylindrical, the control unit 10 activates the variable-speed motors 4c and 6c of the lifting mechanism 4 and the shifting mechanism 6 to move the backup rolls 5 and the speed measuring roll 7b via the support frames 14 and 15 at any desired rapid rate until the backup rolls 5 and the roll 7b are brought into contact and engagement with the periphery of the log 11. The positions to which the rolls 5 and 7b are moved at a rapid rate are determined by the position of the knife carriage 9, which is monitored by the position detector 1b of the feed mechanism 1. The position detectors 4b and 6b are used to count the number of turns of the respective lead screws 4a and 6a to make their associated rolls 5 and 7b to reach the periphery of the log 11. After the engagement of the rolls 5 and 7b with the periphery of the log 11, the rolls 5 and 7b are advanced toward the axial center of the log 11 at the same rate as the feed rate of the knife carriage 9 driven by the feed mechanism 1. This allows the rolls 5 and 7b to maintain the engagement with the periphery of the log 11 to back up or support the log 11 and measure the peripheral speed of the log 11, respectively.

At any suitable time after the engagement of the rolls 5 and 7b with the periphery of the log 11, the pair of spindles 8a are moved away from the axial ends of the log 11 to their retracted, inoperative positions.

During the veneer peeling operation after the retraction of the spindles 8a, the variable-speed motor 1c of the feed mechanism 1 is activated to feed the knife carriage 9 at the feed rate corresponding to the current rotating speed of the log 11 measured by the speed measuring device 7. According to a concrete procedure, the control unit 10 controls operation of the variable-speed motor 1c based on the current rotating speed of the log 11, which is calculated by the calculator 7d of the device 7 from the current peripheral speed of the log 11 measured by the rotation counter 7c and the current diameter of the log 11 indirectly detected by the position detector 1b of the feed mechanism. This allows the veneer knife 13 to cut into the rotating log 11 by an appropriate amount for each turn of the log 11.

In the structure of the first embodiment, operation of the feed mechanism 1 (and thereby operation of the lifting mechanism 4 and the shifting mechanism 6 associated with the feeding operation of the feed mechanism 1) is forcibly stopped, when the difference between the current rotating speed of the log 11 measured by the speed measuring device 7 and the theoretical rotating speed of the log 11 determined corresponding to the data measured by the peripheral drive system 2 exceeds a preset level.

As described previously, the log 11 is driven and rotated at the substantially constant peripheral speed by the drive wheels 2b of the peripheral drive system 2. The CPU of the control unit 10 calculates a theoretical rotating speed of the log 11 based on the substantially constant peripheral speed effected by the peripheral drive system 2 and the current diameter of the log 11 indirectly detected by the position detector 1b of the feed mechanism 1. The CPU then compares the current rotating speed of the log 11 measured by the speed measuring device 7 with the theoretical rotating speed thus calculated. When the difference between the current rotating speed and the theoretical rotating speed of the log 11 is equal to or greater than a preset value previously stored into the ROM of the control unit 10, the CPU stops operation of the respective variable-speed motors 1c, 4c, and 6c of the feed mechanism 1, the lifting mechanism 4, and the shifting mechanism 6.

Figure 2:
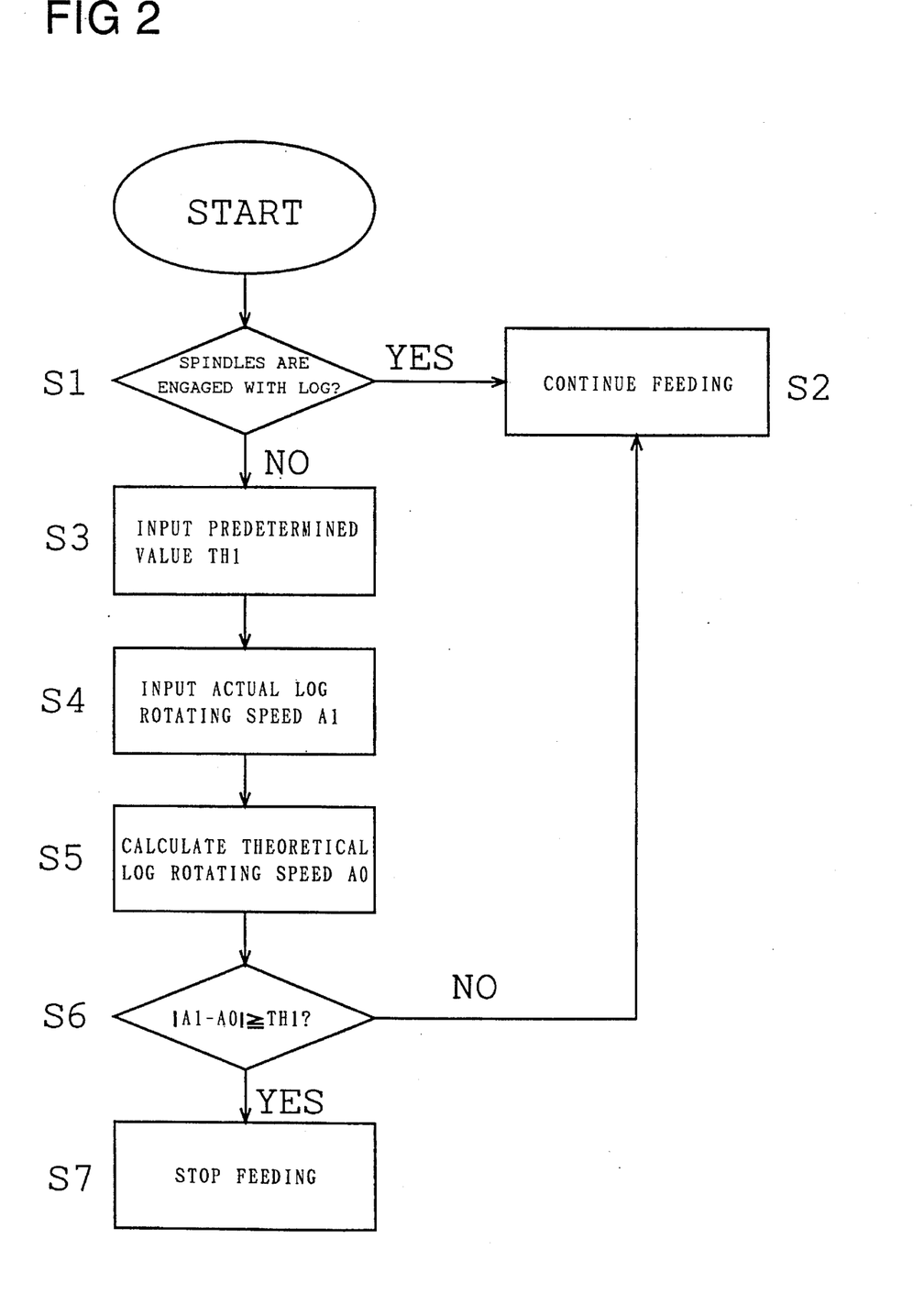
FIG. 2 is a flowchart showing a feed control routine executed in the first embodiment.

FIG. 2 is a flowchart showing a typical feed control routine executed by the CPU of the control unit 10 in the first embodiment. When the program enters the routine, the CPU of the control unit 10 first determines whether the spindles 8a are still engaged with the axial ends of the log 11 at step S1. When the pair of spindles 8a are determined to be in engagement of the log 11, the program proceeds to step S2, at which the feeding operation of the feed mechanism 1 and thereby the veneer peeling operation is continued.

When the pair of spindles 8a are determined to be moved away from the axial ends of the log 11 to their retracted inoperative positions at step S1, on the other hand, the program proceeds to step S3, at which the CPU of the control unit 10 reads a predetermined value TH1 previously stored in the ROM thereof. The CPU of the control unit 10 receives the current rotating speed of the log 11 measured by the speed measuring device 7 as an actual log rotating speed A1 at step S4, and calculates a theoretical log rotating speed A0 based on the substantially constant peripheral speed of the log 11 driven by the peripheral drive system 2 and the current diameter of the log 11 indirectly detected by the position detector 1b of the feed mechanism 1 at step S5.

Although the peripheral drive system 2 rotates the log 11 at the substantially constant peripheral speed in the first embodiment, the peripheral drive system 2 may have the variable driving speed according to the requirements. In the latter case, the variable driving speed should be continuously monitored and input into the control unit 10.

The program then proceeds to step S6, at which the CPU of the control unit 10 determines the difference between the actual log rotating speed A1 and the theoretical log rotating speed A0 and compares the difference with the predetermined value TH1 input at step S3. When the difference between the actual log rotating speed A1 and the theoretical log rotating speed A0 is less than the predetermined value TH1 at step S6, the program proceeds to step S2, at which the feeding operation of the feed mechanism 1 and thereby the veneer peeling operation is continued. When the difference between A1 and A0 is equal to or greater than the predetermined value TH1 at step S6, on the contrary, the program proceeds to step S7, at which the feeding operation of the feed mechanism 1 and thereby the veneer peeling operation is stopped.

Although the position detector 1b incorporated in the feed mechanism 1 is assigned to determine the current diameter of the log 11 in the first embodiment, another position detector 4b or 6b may be used for the same purpose.

In the arrangement of the peripheral drive system 2 applied to the first embodiment of the centerless veneer lathe, the drive wheels 2b are mounted on the common drive shaft 2c, which is supported to be elastically displaceable in a restricted range as indicated by the double-headed arrow Bw B, while each drive wheel 2b has a plurality of peripheral spikes 2a incisable into the peripheral surface of the log 11. Because of the incising engagement, there is very little fear of slippage between the drive wheels 2b and the periphery of the log 11. The elastic displacement of the drive shaft 2c allows the number of spikes 2a arranged on the periphery of each drive wheel 2b to be effectively engaged with the log 11, which decreases its diameter as the veneer peeling operation proceeds. The drives wheels 2b with the spikes 2a ensures the driving stability of the log 11.

With use of such peripheral drive wheels 2b, however, the incising depth of the spikes 2a into the log 11 is varied when the drive shaft 2c is elastically displaced by a variation in hardness of the log peripheral surface. This causes a substantial variation in distance between the periphery of the log 11 and the drive shaft 2c and therefore a variation in relative speeds of the log 11 and the drive wheels 2b, as pointed out previously under the background of the invention. Such variation gives a difference between the actual rotating speed of the log 11 and the theoretical rotating speed of the log 11 driven by the peripheral drive system 2.

The conventional method determines the feed rate of the feed mechanism corresponding to the theoretical rotating speed of the log driven by the peripheral drive system. This undesirably makes the feed rate of the feed mechanism inaccurate, thereby inducing errors in thickness of veneers peeled from the log.

In the structure of the first embodiment, on the contrary, the feed rate of the knife carriage 9 under the centerless condition is adjusted accurately based on the actual rotating speed of the log 11, which is calculated from the current peripheral speed of the rotating log and the current diameter of the log. This structure allows the reed rate in the veneer peeling operation to be adjusted in close relation to the actual rotating speed of the log 11, thereby eliminating errors in veneer sheet thickness due to the inaccurate feed rate.

When the difference between the current rotating speed of the log 11 measured by the speed measuring device 7 and the theoretical rotating speed of the log 11 determined corresponding to the data measured by the peripheral drive system 2 exceeds a preset level, the structure of the first embodiment forcibly stops the feeding operation of the feed mechanism 1 and thereby the veneer peeling operation of the veneer lathe under the centerless condition. This structure effectively prevents the lowered productivity of veneers and keeps the veneers free from obvious or conspicuous traces of engagement with the peripheral drive system or cracks due to the insufficient synchronism of the veneer lathe with a subsequent veneer processing apparatus. Namely the structure of the first embodiment improves the productivity of the veneer lathe.

Figure 3:
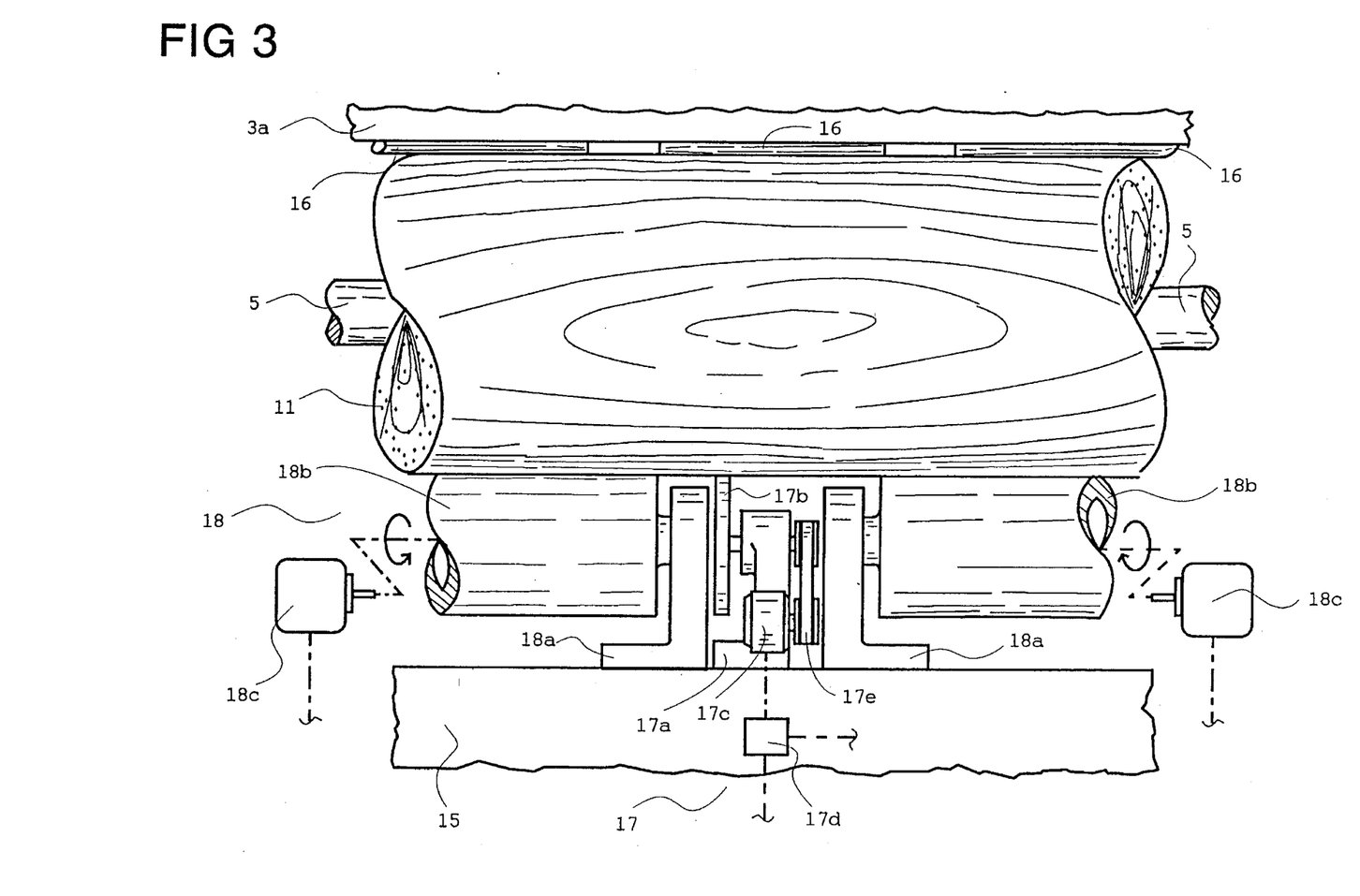
FIG. 3 is a partial plan view schematically illustrating another structure of the centerless veneer lathe, to which the feed controlling method is applied as a second embodiment according to the present invention.

FIG. 3 is a partial plan view schematically illustrating another structure of the centerless veneer lathe, to which the feed controlling method is applied as a second embodiment according to the present invention. The primary difference of the veneer lathe of the second embodiment from that of the first embodiment is in the structure of the peripheral drive system. In the drawing of FIG. 3, like numerals denote the like elements to those in the first embodiment.

The veneer lathe of the second embodiment includes a peripheral drive system 18, in place of the peripheral drive system 2 of the first embodiment. The peripheral drive system 18 includes a plurality of sectional drive rolls 18b frictionally engageable with the periphery of the log 11 on the opposite side of the knife carriage (not shown in FIG. 2). The sectional drive rolls 18b are supported by bearing boxes 18a and driven by constant-speed motors 18c, such as three-phase induction motors. A speed measuring device 17 applied instead of the speed measuring device 7 of the first embodiment includes a speed measuring roll 17b, which is in contact with the periphery of the log 11, rotatably supported by a bearing box 17a, and connected to a rotation counter 17c, such as a rotary encoder, via a toothed belt 17d for transmitting the rotation of the roll 17b to the rotation counter 17c. A calculator 17d incorporated in the speed measuring device 17 calculates the current rotating speed of the log 11 based on the current peripheral speed of the log 11 measured by the rotation counter 17c and the current diameter of the log 11. The sectional pressure bars 3 in the first embodiment are replaced by freely rotatable sectional pressure rolls 16.

Although not shown in the drawing of FIG. 3, the veneer lathe of the second embodiment is further provided with a pair of spindles engageable with the axial ends of the log 11 and a control unit adapted to control the feed of the knife carriage in substantially the same manner as in the first embodiment. Namely the control unit controls the feed of the knife carriage based on the current rotating speed of the log 11, which is calculated by the calculator 17d of the speed measuring device 17 from the current peripheral speed of the log 11 measured by the rotation counter 17c and the current diameter of the log 11. The control unit stops operation of the knife carriage when the difference between the current rotating speed of the log 11 measured by the speed measuring device 17 and the theoretical rotating speed of the log 11 determined corresponding to the data measured by the peripheral drive system 18 exceeds a preset level.

In order to ensure accurate measurement of the peripheral speed of the log 11, the speed measuring roll 17b should be engaged with the periphery of the log 11 with as little slippage as possible. For this purpose, the roll 17b may be coated with material such as rubber or abrasive paper or cloth or has grooves or knurls formed thereon in order to increase the coefficient of friction when being in contact with the peripheral surface of the log 11. Alternatively, the roll 17b may have a number of small projections which do not vary the incising depth into the log 11 with a variation in hardness of the log 11.

The peripheral surface of the drive rolls 18b may also be coated with material such as rubber or abrasive paper or cloth or has grooves or knurls formed thereon in order to increase the coefficient of friction when being in contact with the peripheral surface of the log 11.

In the second embodiment using the drive rolls 18b which are frictionally engaged with the periphery of the log 11, slippage may occur between the drive rolls 18b and the periphery of the log 11, thereby causing a difference between the actual rotating speed of the log 11 and the theoretical rotating speed of the log 11 driven by the peripheral drive system 18.

In substantially the same manner as the first embodiment, the feed rate of the knife carriage 9 under the centerless condition is adjusted accurately based on the actual rotating speed of the log 11, which is calculated from the current peripheral speed of the rotating log and the current diameter of the log. The structure of the second embodiment also allows the feed rate in the veneer peeling operation to be adjusted in close relation to the actual rotating speed of the log 11, thereby eliminating errors in veneer sheet thickness due to the inaccurate feed rate.

When the difference between the current rotating speed of the log 11 measured by the speed measuring device 17 and the theoretical rotating speed of the log 11 determined corresponding to the data measured by the peripheral drive system 18 exceeds a preset level, the structure of the second embodiment also stops the feed of the knife carriage and thereby the veneer peeling operation of the veneer lathe under the centerless condition. This structure effectively prevents the lowered productivity of veneers and keeps the veneers free from obvious or conspicuous traces of engagement with the peripheral drive system or cracks due to the insufficient synchronism of the veneer lathe with a subsequent veneer processing apparatus. Namely the structure of the second embodiment improves the productivity of the veneer lathe.

In the first and the second embodiments described above, the control of feed rate depending upon the actual rotating speed measured by the speed measuring device 7 or 17 is started after the spindles are moved away and disengaged from the axial ends of the log. It may, however, be arranged that such control of the feed rate is initiated before the spindle disengagement.

Figure 4:
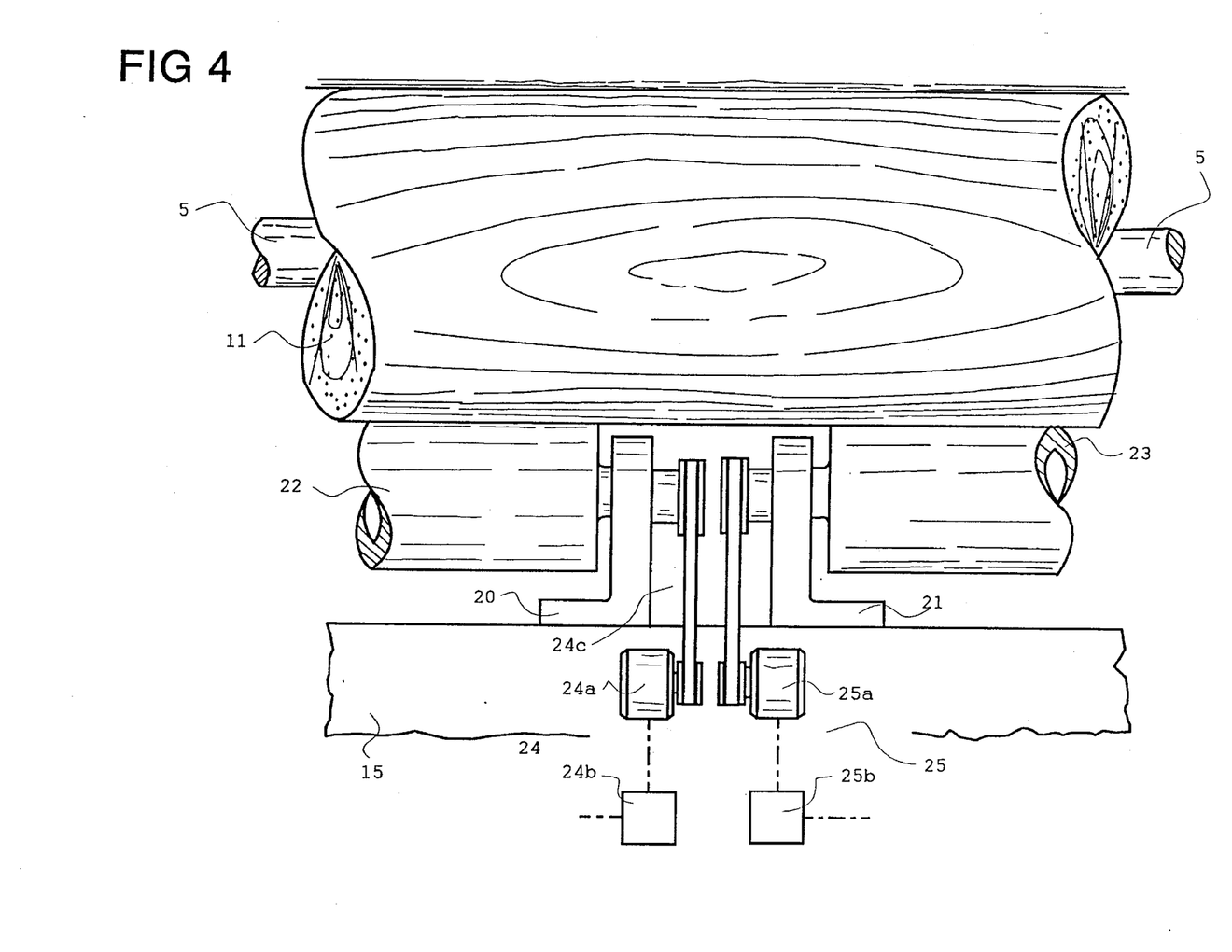
FIG. 4 is a partial plan view schematically illustrating another possible structure of the centerless veneer lathe, to which another feed controlling method is applied as a third embodiment according to the present invention.

FIG. 4 is a partial plan view schematically illustrating another possible structure of the centerless veneer lathe, to which another feed controlling method is applied as a third embodiment according to the present invention. In the drawing of FIG. 4, like numerals denote the like elements to those in the first embodiment.

The veneer lathe of the third embodiment includes the plurality of backup rolls 5 and the support frame 15 like the first embodiment shown in FIG. 1. A plurality of driven rolls 22 and 23 rotatably supported by bearing boxes 20 and 21 are mounted on the support frame 15. The plurality of driven rolls 22 and 23 are arranged in series in a direction of fibers of the log 11 to cover the substantially whole surface of the log 11.

The third embodiment includes a first speed measuring device 24 and a second speed measuring device 25 arranged between the pair of driven rolls 22 and 23. Each of the first speed measuring device 24 and the second speed measuring device 25 includes a rotation counter 24a (25a), a calculator 24b (25b), and a rotation transmitting member 24c (25c), such as a toothed belt, for transmitting the rotation of the driven roll 22 (23) to the rotation counter 24a (25a). The rotation counter 24a (25a) measures the rotating speed of the rotation transmitting member 24c (25c), and the calculator 24b (25b) converts the results of measurement to electric signals and outputs the electric signals to the control unit 10 (not shown in FIG. 4).

In substantially the same manner as the first embodiment shown in FIG. 1, the support frame 15 is activated and driven by the shifting mechanism (not shown), which is controlled by the control unit 10. Though not shown in the drawing of FIG. 4, the veneer lathe of the third embodiment also includes the feed mechanism 1, the peripheral drive system 2, the plurality of sectional pressure bars 3, the lifting mechanism 4, the shifting mechanism 6, the center drive mechanism 8 including the spindles 8a, and the knife carriage 9 with the veneer knife 13.

In the third embodiment, the control unit 10 is also constructed as a microcomputer including a CPU (central processing unit), a ROM (read only memory), and a RAM (random access memory).

While the spindles 8a are engaged with the log 11 having the irregular peripheral surface in the process of veneer peeling operation, the feed rate of the feed mechanism 1 is adjusted corresponding to the rotating speed of the spindles 8a.

At any convenient time during the veneer peeling operation and before the spindles 8a are retracted away from the log axial ends to hold the veneer lathe in a centerless condition, for example, at a time immediately after the log 11 has been rounded to become substantially cylindrical, the control unit 10 receives signals manually input by an operator and activates the lifting mechanism 4 and the shifting mechanism 6 to move the pair of driven rolls 22 and 23 mounted on the support frame 15 as well as the plurality of backup rolls 5 mounted on the support frame 14 until the backup rolls 5 and the driven rolls 22 and 23 are brought into contact and engagement with the periphery of the log 11. Rotation of the log 11 is accordingly transmitted to rotate the pair of driven rolls 22 and 23 at an identical rotating speed. The rotations of the first and the second driven rolls 22 and 23 are then transmitted to the rotation transmitting members 24b and 25b, respectively. The first and the second rotation counters 24a and 25a measure the respective rotating speeds of the first and the second rotation transmitting members 24c and 25c, and the first and the second calculators 24b and 25b convert the results of measurement to electric signals and output the electric signals representing the rotating speeds of the first and the second driven rolls 22 and 23 to the control unit 10.

In response to the electric signals, the control unit 10 disengages the pair of spindles 8a from the axial ends of the log 11 to their retracted, inoperative positions. During the veneer peeling operation after the retraction of the spindles 8a, the feed rate of the feed mechanism 1 is controlled corresponding to the current rotating speeds of the log 11 measured by the first and the second speed measuring devices 24 and 25.

The control unit 10 stops operation of the feed mechanism 1 under the centerless condition, when either the first difference between the current rotating speed of the log 11 measured by the first speed measuring device 24 and the theoretical rotating speed of the log 11 determined corresponding to the data measured by the peripheral drive system 2 or the second difference between the current rotating speed of the log 11 measured by the second speed measuring device 25 and the theoretical rotating speed of the log 11 exceeds a preset level.

Figure 5:
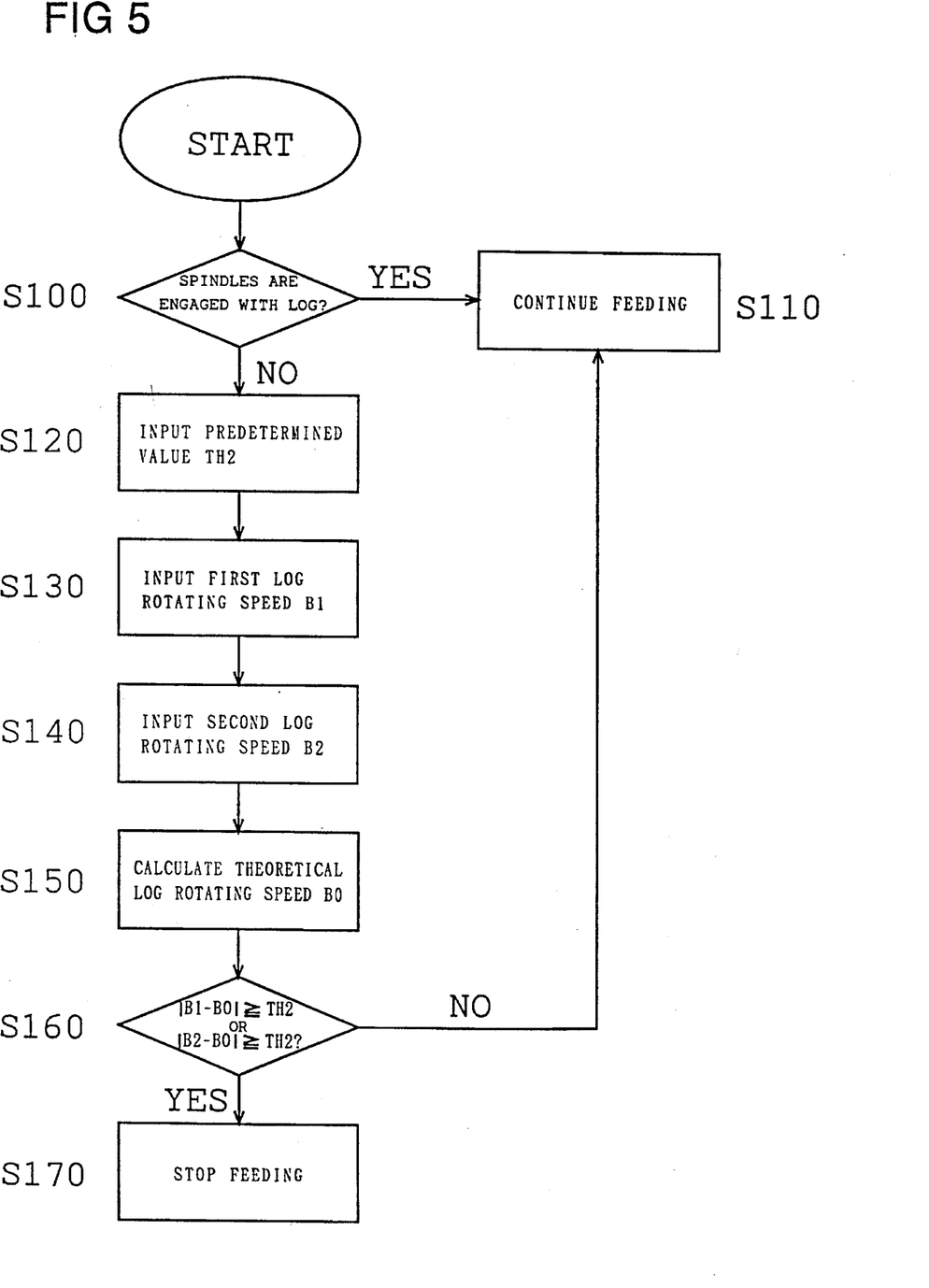
FIG. 5 is a flowchart showing a feed control routine executed in the third embodiment.

FIG. 5 is a flowchart showing a typical feed control routine executed by the CPU of the control unit 10 in the third embodiment. When the program enters the routine, the CPU of the control unit 10 first determines whether the spindles 8a are still engaged with the axial ends of the log 11 at step S100. When the pair of spindles 8a are determined to be in engagement of the log 11, the program proceeds to step S110, at which the feeding operation of the feed mechanism 1 and thereby the veneer peeling operation is continued.

When the pair of spindles 8a are determined to be moved away from the axial ends of the log 11 to their retracted inoperative positions at step S100, on the other hand, the program proceeds to step S120, at which the CPU of the control unit 10 reads a predetermined value TH2 previously stored in the ROM thereof. The CPU of the control unit 10 receives the current rotating speed of the log 11 measured by the first speed measuring device 24 as a first log rotating speed B1 at step S130 and the current rotating speed of the log 11 measured by the second speed measuring device 25 as a second log rotating speed B2 at step S140. The CPU then calculates a theoretical log rotating speed B0 based on the substantially constant peripheral speed of the log 11 driven by the peripheral drive system 2 and the current diameter of the log 11 indirectly detected by the position detector 1b of the feed mechanism 1 at step S150.

Although the peripheral drive system 2 rotates the log 11 at the substantially constant peripheral speed in the third embodiment, the peripheral drive system 2 may have the variable driving speed according to the requirements. In the latter case, the variable driving speed should be continuously monitored and input into the control unit 10.

The program then proceeds to step S160, at which the CPU of the control unit 10 determines a first difference between the first log rotating speed B1 and the theoretical log rotating speed B0 and a second difference between the second log rotating speed B2 and the theoretical log rotating speed B0 and compares both the first difference and the second difference with the predetermined value TH2 input at step S120. When both the first difference between the first log rotating speed B1 and the theoretical log rotating speed B0 and the second difference between the second log rotating speed B2 and the theoretical log rotating speed B0 are less than the predetermined value TH2 at step S160, the program proceeds to step S110, at which the feeding operation of the feed mechanism 1 and thereby the veneer peeling operation is continued. When either the first difference between B1 and B0 or the second difference between B2 and B0 is equal to or greater than the predetermined value TH2 at step S160, on the contrary, the program proceeds to step S170, at which the feeding operation or the feed mechanism 1 and thereby the veneer peeling operation is stopped.

In the process of veneer peeling operation with the veneer knife 13, the log 11 receives pressure in the horizontal direction. In the structure of the first embodiment, the log 11 receives pressure from the drive wheels 2b, the sectional pressure bars 3, and the veneer knife 13 in one direction and pressure from the speed measuring roll 7b in the opposite direction. In the structure of the second embodiment, the log 11 receives pressure from the sectional pressure rolls 16 and the veneer knife 13 in one direction and pressure from the drive rolls 18b in the opposite direction.

As the veneer peeling operation proceeds under the centerless condition that the spindles 8a are away from the log 11, the veneer knife 13 approaches the center portion of the log 11, which is often made of wood having a relatively low strength. The log 11 generally has varied strength along its fibers. Such application of pressure may damage and break part of the log 11 along its fibers, for example, the part of the log 11 which is in contact with the right drive roll 18b in the second embodiment shown in FIG. 3.

In the veneer lathe of the first embodiment shown in FIG. 1 under such condition, the non-damaged part of the log 11 is in contact with the speed measuring roll 7b and the backup rolls 5 while being driven by the drive wheels 2b. In the veneer lathe of the second embodiment shown in FIG. 3, the non-damaged part of the log 11 is in contact with the left drive roll 18b, the speed measuring roll 17b, the sectional pressure rolls 16, and the backup rolls 5 while being driven by the drive roll 18b. Feeding the knife carriage 9 to the log 11 by the feed mechanism 1 therefore the veneer peeling operation is thus not interrupted but continued. This may cause the spaces between various elements of the veneer lathe to be clogged with the broken pieces of the log 11. Even when no troubles arise, the veneers peeled from the partly damaged log 11 are not usable and the productivity of the veneer lathe is undesirably lowered.

In the structure of the third embodiment, however, when the application of pressure damages and breaks the part of the log 11 which is in contact with the second driven roll 23, no rotational force is transmitted to the driven roll 23 and the rotating speed of the driven roll 23 gradually decreases. The change in rotating speed of the second driven roll 23 is measured by the second rotation counter 25a via the second rotation transmitting member 25c and output from the second calculator 25b as a signal representing the lowered rotating speed to the control unit 10. The control unit 10 successively compares the signals output from the first and the second calculators 24b and 25b with the signal representing the theoretical rotating speed of the log 11 effected by the peripheral drive system 2. When the difference between the signal output from the second calculator 25b and the theoretical rotating speed exceeds a preset limit, the control unit 10 forcibly stops the feeding operation by the feed mechanism 1.

The structure of the third embodiment effectively prevents the expected trouble, that is, clogging the spaces between various elements of the veneer lathe with the broken pieces of the log 11. The immediate stop of the feeding operation does not lower the productivity of the veneer lathe.

Although the structure of the third embodiment has two driven rolls 22 and 23, the veneer lathe may include a larger number of driven rolls to deal with the possible trouble arising when only a small part of the log 11 is damaged and broken.

There may be many other modifications, alternations, and changes without departing from the scope or spirit of essential characteristics of the invention. It is thus clearly understood that the above embodiments are only illustrative and not restrictive in any sense.

Structure of the speed measuring device may be modified or changed according to the requirements of the veneer lathe to which the method of the present invention is applied. For example, though the calculator for calculating the current rotating speed of the log is incorporated in the speed measuring device in the above embodiments, the control unit may be used instead of such a calculator.

The principle of the present invention is also applicable to known centerless veneer lathes having different configurations from those described above; for example, a lathe having plural rows of drive wheels or drive rolls arranged at different circumferential positions around a log or a lathe without spindles which is designed to receive and process only those logs previously rounded.

The scope and spirit of the present invention are limited only by the terms of the appended claims.

What is claimed is:

1. A method of controlling feed in a veneer lathe under a centerless condition, said veneer lathe used for peeling veneers from a log including a movable knife carriage having a veneer knife carried thereon, feed means for feeding said knife carriage toward said log at a controlled variable feed rate, peripheral drive means for rotating said log from the periphery thereof in a predetermined direction at a first peripheral speed, and a pair of rotatable spindles engageable with said log at the axial opposite ends thereof for rotating said log while holding said log therebetween, said pair of spindles being disengageable from said log ends in the middle of a veneer peeling operation to hold said veneer lathe in said centerless condition, said method comprising the steps of:

(a) monitoring a current diameter of said log while the log diameter is being decreased as the veneer peeling operation proceeds;

(b) measuring a current peripheral speed of said rotating log;

(c) calculating a current rotating speed of said log based on the current diameter of said log monitored in said step (a) and the current peripheral speed of said log measured in said step (b);

(d) controlling the feed rate of said knife carriage at least under the centerless condition, based on the current rotating speed of said log calculated in said step (c);

(e) calculating a theoretical rotating speed of said log based on the first peripheral speed of said log driven by said peripheral drive means and the current diameter of said log monitored in said step (a);

(f) comparing the current rotating speed of said log calculated in said step (c) with the theoretical rotating speed of said log calculated in said step (e) to determine a difference between the current rotating speed and the theoretical rotating speed of said log; and (g) forcibly stopping the feed of said knife carriage by said feed means when the difference between the current rotating speed and the theoretical rotating speed of said log is not less than a preset level.

2. A method of controlling feed in a veneer lathe under a centerless condition, said veneer lathe used for peeling veneers from a log including a movable knife carriage having a veneer knife carried thereon, feed means for feeding said knife carriage toward said log at a controlled variable feed rate, peripheral drive means for rotating said log from the periphery thereof in a predetermined direction at a first peripheral speed, and a pair of rotatable spindles engageable with said log at the axial opposite ends thereof for rotating said log while holding said log therebetween, said pair of spindles being disengageable from said log ends in the middle of a veneer peeling operation to hold said veneer lathe in said centerless condition, said method comprising the steps of:

(a) monitoring a current diameter of said log while the log diameter is being decreased as the veneer peeling operation proceeds;

(b) measuring current peripheral speeds of said rotating log at a plurality of different positions in a direction of fibers of said log;

(c) calculating a plurality of current rotating speeds of said log based on the current diameter of said log monitored in said step (a) and the current peripheral speeds of said log measured in said step (b);

(d) controlling the feed rate of said knife carriage at least under the centerless condition, based on one of the plurality of current rotating speeds of said log calculated in said step (c);

(e) calculating a theoretical rotating speed of said log based on the first peripheral speed of said log driven by said peripheral drive means and the current diameter of said log monitored in said step (a);

(f) comparing the plurality of current rotating speeds of said log calculated in said step (c) with the theoretical rotating speed of said log calculated in said step (e) to determine differences between the respective current rotating speeds and the theoretical rotating speed of said log; and (g) forcibly stopping the feed of said knife carriage by said feed means when at least one of the differences between the respective current rotating speeds and the theoretical rotating speed of said log is not less than a preset level.

3. An apparatus for controlling feed in a veneer lathe under a centerless condition, said veneer lathe used for peeling veneers from a log including a movable knife carriage having a veneer knife carried thereon, feed means for feeding said knife carriage toward said log at a controlled variable feed rate, peripheral drive means for rotating said log from the periphery thereof in a predetermined direction at a first peripheral speed, and a pair of rotatable spindles engageable with said log at the axial opposite ends thereof for rotating said log while holding said log therebetween, said pair of spindles being disengageable from said log ends in the middle of a veneer peeling operation to hold said veneer lathe in said centerless condition, said apparatus comprising monitor means for monitoring a current diameter of said log while the log diameter is being decreased as the veneer peeling operation proceeds, peripheral speed measuring means engageable with said log on the peripheral surface thereof and rotating therewith for measuring a current peripheral speed of said rotating log, first calculation means for calculating a current rotating speed of said log based on the current diameter of said log monitored by said monitor means and the current peripheral speed of said log measured by said peripheral speed measuring means, control means for controlling the feed rate of said knife carriage at least under the centerless condition, based on the current rotating speed of said log calculated by said first calculation means, second calculation means for calculating a theoretical rotating speed of said log from the first peripheral speed of said log driven by said peripheral drive means and the current diameter of said log monitored by said monitor means, comparison means for comparing the current rotating speed of said log calculated by said first calculation means with the theoretical rotating speed of said log calculated by said second calculation means to determine a difference between the current rotating speed and the theoretical rotating speed of said log, and stop means for forcibly stopping the feed of said knife carriage by said feed means when the difference between the current rotating speed and the theoretical rotating speed of said log is not less than a preset level.

4. An apparatus in accordance with claim 3, wherein said peripheral drive means comprises a plurality of drive wheels, each said drive wheel having a number of spikes arranged on a periphery thereof to be engageable with the peripheral surface of said log.

5. An apparatus for controlling feed in a veneer lathe under a centerless condition, said veneer lathe used for peeling veneers from a log including a movable knife carriage having a veneer knife carried thereon, feed means for feeding said knife carriage toward said log at a controlled variable feed rate, peripheral drive means for rotating said log from the periphery thereof in a predetermined direction at a first peripheral speed, and a pair of rotatable spindles engageable with said log at the axial opposite ends thereof for rotating said log while holding said log therebetween, said pair of spindles being disengageable from said log ends in the middle of a veneer peeling operation to hold said veneer lathe in said centerless condition, said apparatus comprising monitor means for monitoring a current diameter of said log while the log diameter is being decreased as the veneer peeling operation proceeds, a plurality of peripheral speed measuring means arranged at a plurality of different positions in a direction of fibers of said log on the peripheral surface thereof, each said peripheral speed measuring means comprising a roll member engageable with the peripheral surface of said log and independently driven and rotated thereby for measuring a current peripheral speed of said rotating log, first calculation means for calculating a plurality of current rotating speeds of said log based on the current diameter of said log monitored by said monitor means and a plurality of current peripheral speeds of said log measured by said plurality of peripheral speed measuring means, control means for controlling the feed rate of said knife carriage at least under the centerless condition, based on one of the plurality of current rotating speeds of said log calculated by said first calculation means, second calculation means for calculating a theoretical rotating speed of said log from the first peripheral speed of said log driven by said peripheral drive means and the current diameter of said log monitored by said monitor means, comparison means for comparing the plurality of current rotating speeds of said log calculated by said first calculation means with the theoretical rotating speed of said log calculated by said second calculation means to determine differences between the respective current rotating speeds and the theoretical rotating speed of said log, and stop means for forcibly stopping the feed of said knife carriage by said feed means when at least one of the differences between the respective current rotating speeds and the theoretical rotating speed of said log is not less than a preset level.

6. An apparatus in accordance with claim 3 or claim 5, wherein said roll members of said peripheral speed measuring means are independently driven and rotated by said log and work as backup rolls.

7. An apparatus in accordance with claim 5, wherein said peripheral drive means comprises a plurality of drive wheels, each said drive wheel having a number of spikes arranged on the periphery thereof to be engageable with the peripheral surface or said log, said plurality of drive wheels being arranged at positions substantially corresponding to those of said roll members of said peripheral speed measuring means that are independently driven and rotated by said log.

* * * * *